Patented Oct. 28, 1941

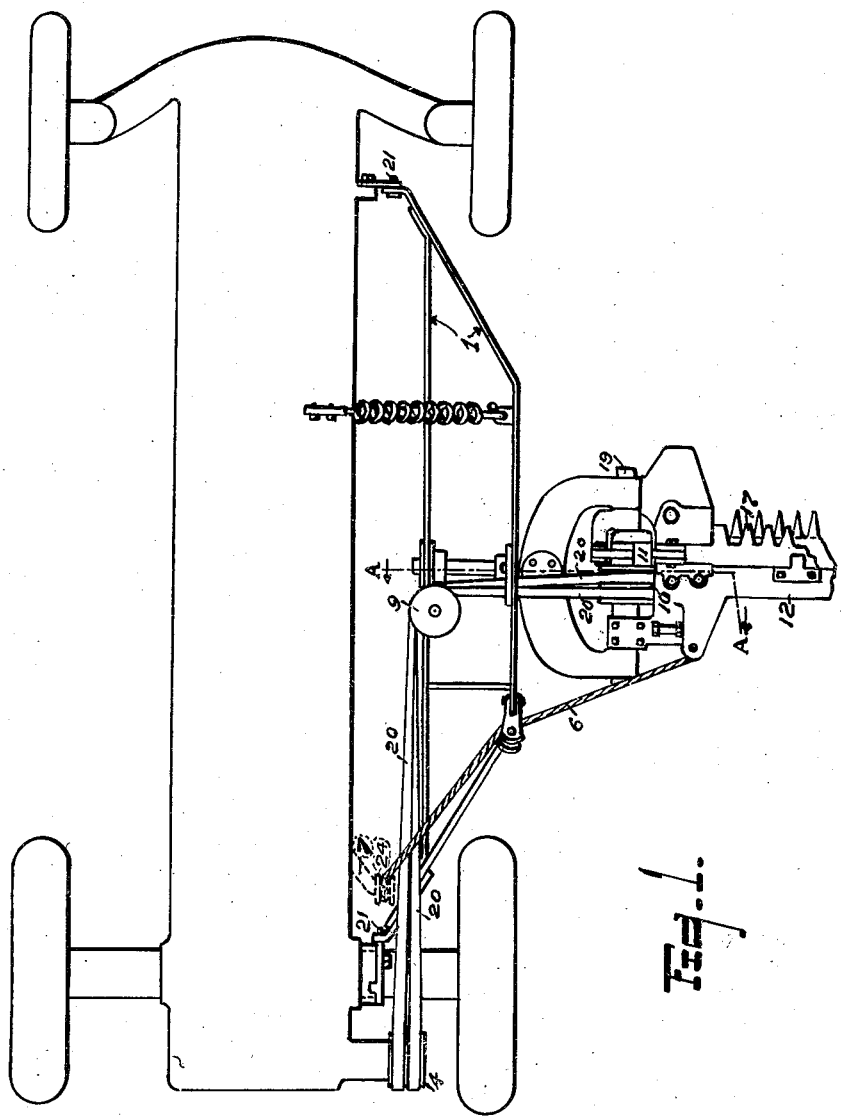

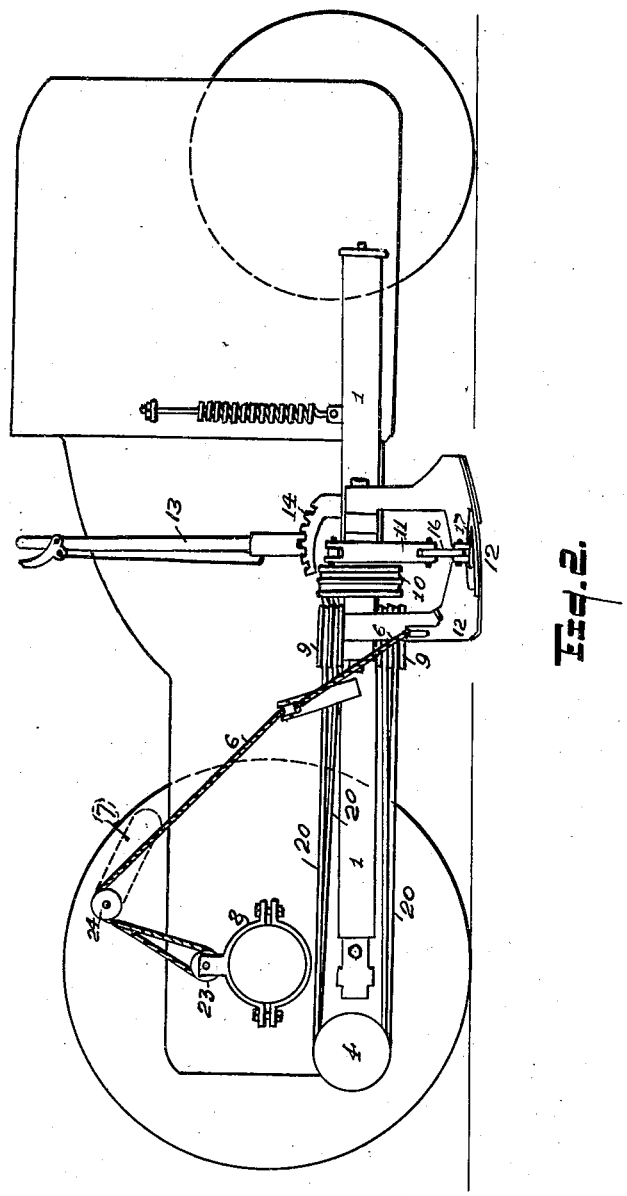

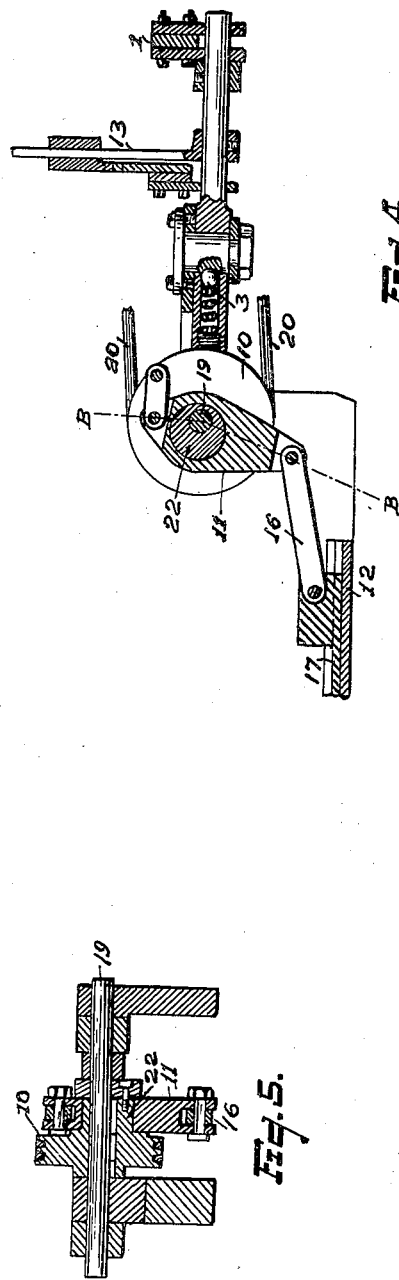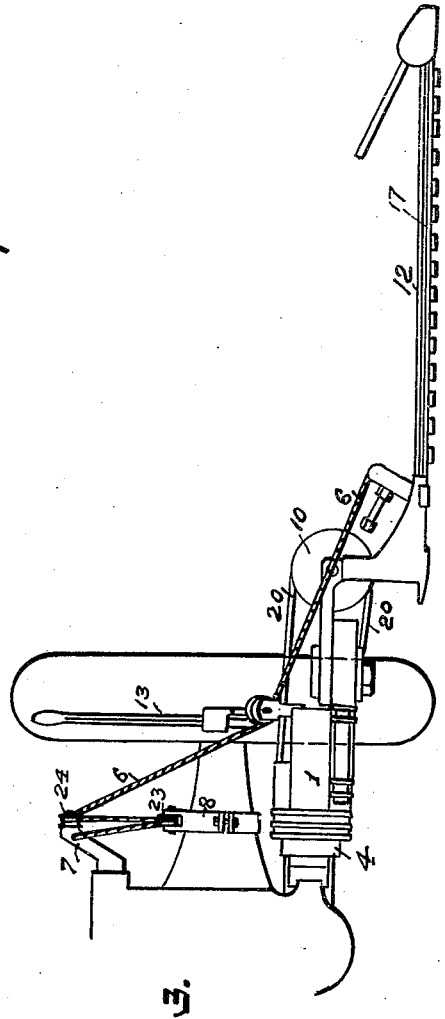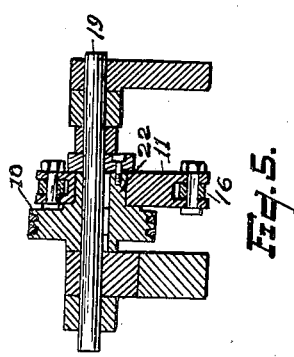

2,260,668

UNITED STATES PATENT OFFICE 2,260,668

MOWING ATTACHMENT FOR TRACTORS

Joseph E. Horste, Detroit, Mich.

Application November 1, 1940, Serial No. 363,798

4 Claims. (Cl. 56—25)

My invention relates to a mowing attachment for tractors, shown in the accompanying drawings, and more particularly described in the following specification and claims. One object of the invention is a simplified construction whereby the manufacturing cost has been reduced without impairment of efficiency, while its operating speed has multiplied.

A further object of the invention is to provide an attachment which may be quickly installed on or removed from the tractor without changing the construction of the latter; other advantages and improvements will hereafter appear.

In the drawings accompanying this specification:

Figure 1 is a plan view of the mowing attachment attached to a tractor; indicated by broken lines, a fragment of the cutter only being shown.

Figure 2 is a side elevation of the mowing attachment, secured to the tractor; the latter being indicated by broken lines.

Figure 3 is a rear elevation of the mowing attachment secured to the tractor, a fragment of the latter being indicated by broken lines.

Figure 4 is a vertical fragmentary sectional view taken on or about A—A Figure 1, looking in the direction indicated by the arrows.

Figure 5 is a vertical sectional view of a detail, taken on or about broken line B—B, see Figure 4.

Referring now to the reference characters upon the drawings:

The mowing bar 12, is attached to the tractor by a specially constructed frame 1, which permits fastening to the tractor at only two points 21—21, see Fig. 1. This two-point connection facilitates removal when the tractor is to be used for other purposes. The mowing bar 12, is of standard construction and the sickle 17, is operated in a reciprocal manner by a cam 22, see Figures 4 and 5, which is part of the fly wheel 10, Figure 3. A rocker arm 11, see Figures 1—2—4—5, is held stationary at the short end and as the fly wheel 10, revolves the cam 22, forces the long end of the rocker arm 11, to reciprocate in a horizontal direction. By the employment of a suitable linkage 16, see Figures 4—5 this motion is transmitted to the sickle 17.

The fly wheel 10, is driven from a pulley 4, see Figures 1, 2, 3, which is part of the tractor, through two V belts 20. These belts change in travelling from a line parallel to the tractor to a line at right angles to the tractor upon passing around two idler pulleys 9, see Figures 1, 2. This method of driving the mowing mechanism by V belts direct to the flywheel has not been used before in mowing machine construction.

The object is to reduce the manufacturing cost and to provide a means of turning the flywheel, while the mowing bar 12, is in a vertical position. This is accomplished by revolving the flywheel 10, around the same shaft 19, see 1—3—4—5, that the mowing bar hinges on while raising to a vertical position.

The mowing bar is raised by means of a cable 6, operated by an arm 7; the arm being a part of the tractor, see Figures 1, 2 and 3. One end of the cable is fastened to the mowing bar 12, see Figures 1, 2, 3. The other end of the cable is attached to the arm 7, it then passes under a roller 23, which is secured to the axle of the tractor by the clamp 8 (see Figures 2 and 3), and then back over roller 24, which is attached to arm 7, see Figure 2. Upon the arm 7 being rocked, the mowing bar raises three times as fast as said arm because of compound leverage gained by going around pulleys 23 and 24, see Figure 2.

When the mowing bar 12, strikes an obstruction, it releases and drops back from a position held at right angles to the tractor, by the spring and ball detent 3; (see Figure 4) until the mowing bar is released from the obstruction.

A manually operated bell-crank lever 13 is pivoted to a sector 14, having notches to receive the usual spring actuated dog, whereby the cutter unit may be tilted to ride over stones or other like obstructions.

When it is desired to remove the mowing unit from the tractor, the attachment may be readily disconnected at the two-point fastening 21—21, which secures it to the frame.

I claim:

1. In a mowing attachment for a tractor, the combination of a mowing bar and sickle; a frame adapted to pivotally support said mowing bar and sickle at two points spaced apart upon the tractor, a cable attached at one end to the mowing bar and sickle; means adapted to support and to multiply the traveling speed of said cable, whereby the mowing bar may be rapidly raised and lowered, comprising a plurality of pulleys over which said cable travels, and a rocking arm carried by the tractor and connected to the other end of the cable, whereby upon operating the rocking-arm the mowing bar and sickle may be raised or lowered.

2. A mowing attachment for tractors comprising a frame for extending longitudinally of a tractor at a side thereof, brackets pivoted to the frame and adapted to mount the frame for vertical swinging movement from a lowered horizontal position to a raised position, a yoke extending laterally from said frame and having a shank at its inner end journaled through the bracket, a mowing bar pivoted to the yoke for vertical swinging movement from a lowered position to a raised position, a sickle mounted for reciprocating movement longitudinally of the mowing bar, a latch lever carried by said shank for imparting transverse rocking adjustment to the mowing bar, a rack carried by said frame for engagement by the latch lever to hold the mowing bar in a rocked position of adjustment, means for swinging the mowing bar from a lowered position to a raised position, and means for transmitting reciprocating movement to the sickle.

3. A mowing attachment for a tractor comprising a frame for extending longitudinally of a tractor at a side thereof, brackets for mounting the frame at the said side of said tractor, a yoke carried by said frame and extending outwardly therefrom, a mowing bar pivoted to said yoke for vertical swinging movement from a lowered position to a raised position, a collar for fitting about an axle casing of the tractor at the said side thereof, a guide pulley carried by said collar, a guide pulley carried by said frame, said tractor having an arm mounted for swinging movement, and a line secured at its ends to the tractor and the mowing bar and trained about the pulleys whereby upward swinging of the tractor arm will swing the mowing bar to a raised position.

4. A mowing attachment for a tractor comprising a frame for extending longitudinally of a tractor at a side thereof, brackets for mounting the frame at the said side of said tractor, a yoke carried by said frame and extending outwardly therefrom, a mowing bar pivoted to said yoke for vertical swinging movement from a lowered position to a raised position, a sickle movably carried by said mowing bar, means for transmitting motion from a power take off of the tractor to the sickle, stationary guide pulleys carried by the frame and the tractor, the tractor having an arm mounted for vertical swinging movement and carrying a pulley, and a line connected with the tractor and the mowing bar and engaged with the pulleys whereby upward swinging of the arm will swing the mowing bar to a raised position.

JOSEPH E. HORSTE.